(12) United States Patent
Schwager et al.

(10) Patent No.: US 11,347,262 B2
(45) Date of Patent: May 31, 2022

(54) DISPLAY CHASSIS COVER DESIGN FOR NARROW BORDER PORTABLE INFORMATION HANDLING SYSTEM

(71) Applicant: Dell Products L.P., Round Rock, TX (US)

(72) Inventors: Mark Andrew Schwager, Cedar Park, TX (US); Yu-Feng Huang, Hsin-Chu (TW); Kai-Yuan Cheng, Taipei (TW); Nicholas G. DiLoreto, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/079,823

(22) Filed: Oct. 26, 2020

(65) Prior Publication Data
US 2022/0129033 A1    Apr. 28, 2022

(51) Int. Cl.
*G06F 1/16* (2006.01)
(52) U.S. Cl.
CPC .......... *G06F 1/1616* (2013.01); *G06F 1/1637* (2013.01)
(58) Field of Classification Search
CPC ............................. G06F 1/1681; G06F 1/1683
See application file for complete search history.

(56) References Cited

U.S. PATENT DOCUMENTS

| | | | | |
|---|---|---|---|---|
| 4,802,605 A * | 2/1989 | Salmon | ................. | G06F 1/1616 16/267 |
| 4,959,887 A * | 10/1990 | Gruenberg | ............ | G06F 1/1616 16/223 |
| 5,001,659 A * | 3/1991 | Watabe | ................. | G06F 1/1616 16/221 |
| 5,103,377 A * | 4/1992 | Kobayashi | ............ | G06F 1/1681 361/679.28 |
| 5,177,672 A * | 1/1993 | Ito | ......................... | G06F 1/1616 361/741 |
| 5,383,138 A * | 1/1995 | Motoyama | ................ | E05C 1/16 361/679.27 |
| 5,390,075 A * | 2/1995 | English | ................. | G06F 1/1616 16/386 |
| 5,995,373 A * | 11/1999 | Nagai | .................... | G06F 1/1616 16/223 |
| 6,011,699 A * | 1/2000 | Murray | ................. | G06F 1/1632 361/814 |
| 6,028,764 A * | 2/2000 | Richardson | ........... | G06F 1/1616 248/917 |
| 6,076,786 A * | 6/2000 | Meyer | ................... | G06F 1/1616 248/161 |
| 6,091,601 A * | 7/2000 | Schlesener | ............ | G06F 1/1616 361/679.28 |

(Continued)

*Primary Examiner* — Adrian S Wilson
(74) *Attorney, Agent, or Firm* — Terrile, Cannatti & Chambers; Stephen A. Terrile

(57) ABSTRACT

A portable information handing system. The portable information handling system includes a base chassis, the base chassis comprising a motherboard, the motherboard comprising a processor and a bus coupled to the processor; and, a display chassis, the display chassis comprising a rear display cover, the rear display cover comprising an attachment assembly, the attachment assembly comprising a hinge assembly, the rear display cover being rotationally-coupled to the base chassis via the hinge assembly, the hinge assembly providing structural support for the display chassis.

15 Claims, 8 Drawing Sheets

(56) References Cited

U.S. PATENT DOCUMENTS

| | | | | |
|---|---|---|---|---|
| 6,125,029 A | * | 9/2000 | Sasaki | G06F 1/165 |
| | | | | 345/905 |
| 6,223,393 B1 | * | 5/2001 | Knopf | G06F 1/1618 |
| | | | | 16/366 |
| 6,252,767 B1 | * | 6/2001 | Carlson | G06F 1/1616 |
| | | | | 292/148 |
| 7,054,147 B2 | * | 5/2006 | Maatta | G06F 1/1616 |
| | | | | 16/368 |
| 2001/0048587 A1 | * | 12/2001 | Yim | G06F 1/1681 |
| | | | | 361/679.21 |
| 2003/0213101 A1 | * | 11/2003 | Lin | G06F 1/1683 |
| | | | | 16/368 |
| 2007/0146978 A1 | * | 6/2007 | Nakatani | G06F 1/1683 |
| | | | | 361/679.27 |

\* cited by examiner

DISPLAY CHASSIS COVER DESIGN FOR NARROW BORDER PORTABLE INFORMATION HANDLING SYSTEM

BACKGROUND OF THE INVENTION

Field of the Invention

The present invention relates to information handling systems. More specifically, embodiments of the invention relate to a display chassis cover design in a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a portable information handing system, comprising: a base chassis portion, the base chassis portion comprising a motherboard; a display chassis portion, the display chassis portion comprising a rear display cover portion, the rear display cover portion comprising an attachment assembly, the attachment assembly comprising a hinge assembly, the rear display cover portion being rotationally-coupled to the base chassis portion via the hinge assembly, the hinge assembly providing structural support for the display chassis portion.

In another embodiment the invention relates to an information handling system comprising: a base chassis, the base chassis comprising a motherboard, the motherboard comprising a processor and a bus coupled to the processor; a display chassis, the display chassis comprising a rear display cover, the rear display cover comprising an attachment assembly, the attachment assembly comprising a hinge assembly, the rear display cover being rotationally-coupled to the base chassis via the hinge assembly, the hinge assembly providing structural support for the display chassis.

In another embodiment the invention relates to a display chassis, comprising: a rear display cover, the rear display cover comprising an attachment assembly, the attachment assembly comprising a hinge assembly, the rear display cover being rotationally-coupled to the base chassis via the hinge assembly, the hinge assembly providing structural support for the display chassis.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
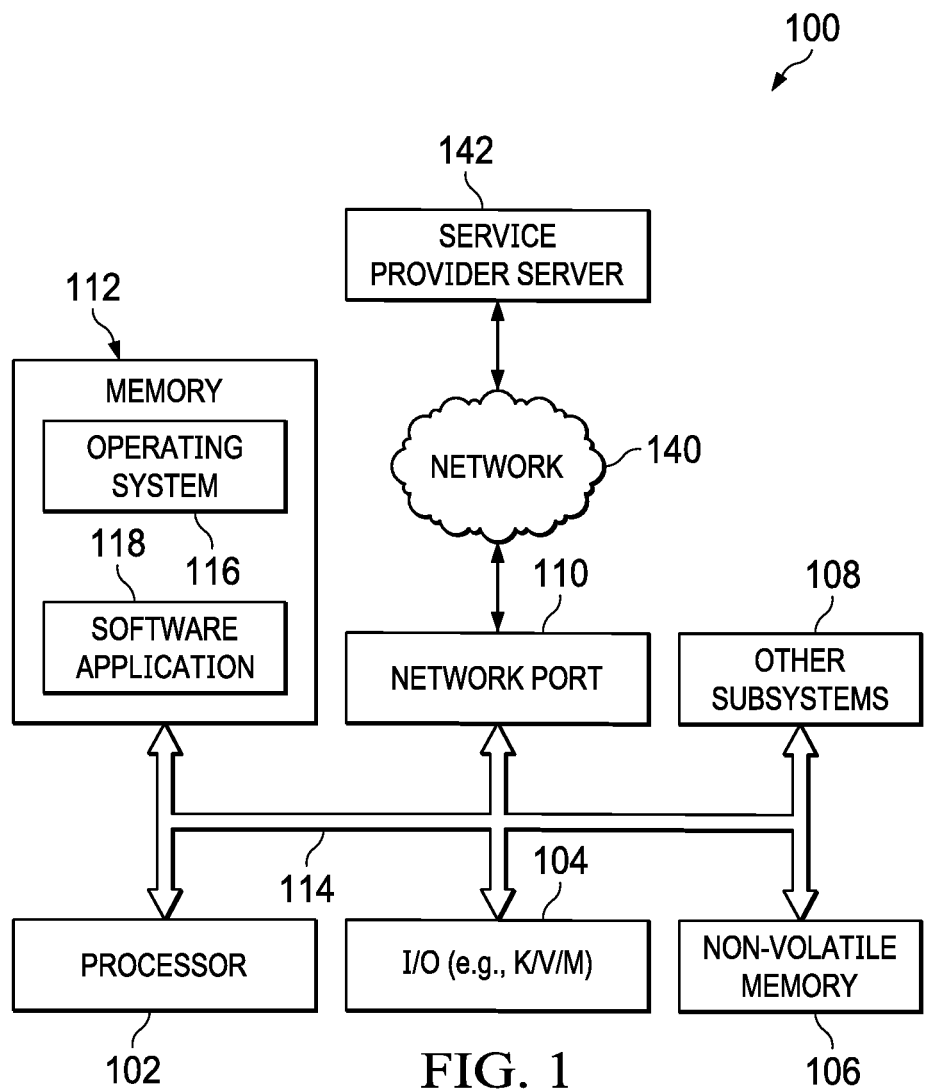
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
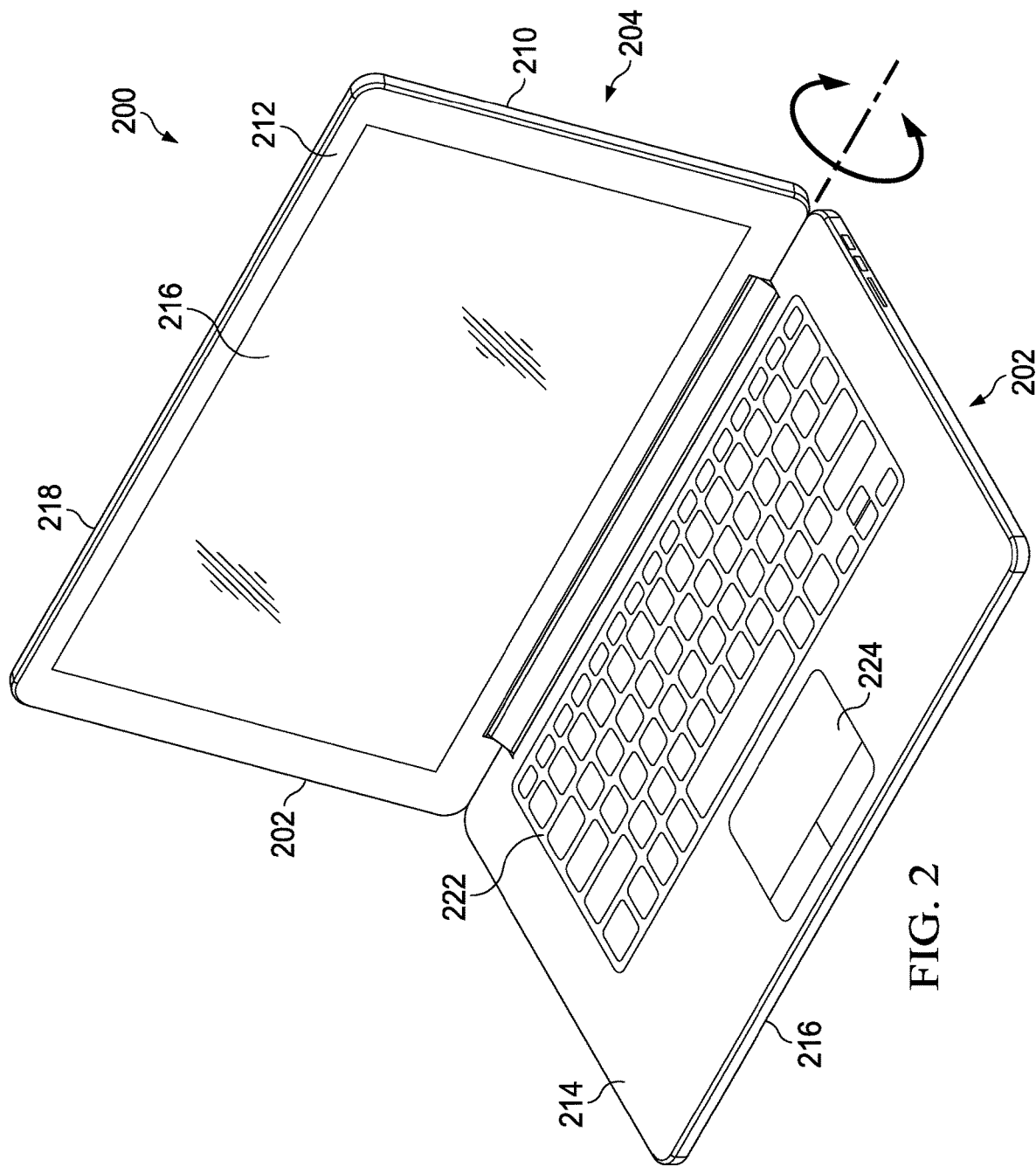
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 202 forms a top outer protective shell, or a portion of a lid, for the information handling system 200, while the D-cover 204 forms a bottom outer protective shell, or a portion of a base, for the information handling system. When in the fully closed configuration, the A-cover 202 and the D-cover 204 would be substantially parallel to one another.

In some embodiments, both the A-cover 202 and the D-cover 204 may be comprised entirely of metal. In some embodiments, the A-cover 202 and D-cover 204 may include both metallic and plastic components. For example, plastic components that are radio-frequency (RF) transparent may be used to form a portion of the C-cover 208.

In various embodiments, the A-cover 202 may be movably connected to a back edge of the C-cover 204 via one or more hinges. In this configuration, the hinges allow the A-cover 202 to rotate from and to the C-cover 204 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the A-cover 204 with regard to the C-cover 204, for example up to 180° rotation arc. In other embodiments the information handling system 200 may be a convertible information handling system with full rotation to a tablet configuration. It will be appreciated that in other embodiments, the A-Cover could attach to the C-Cover or the D-Cover.

Figure 3:
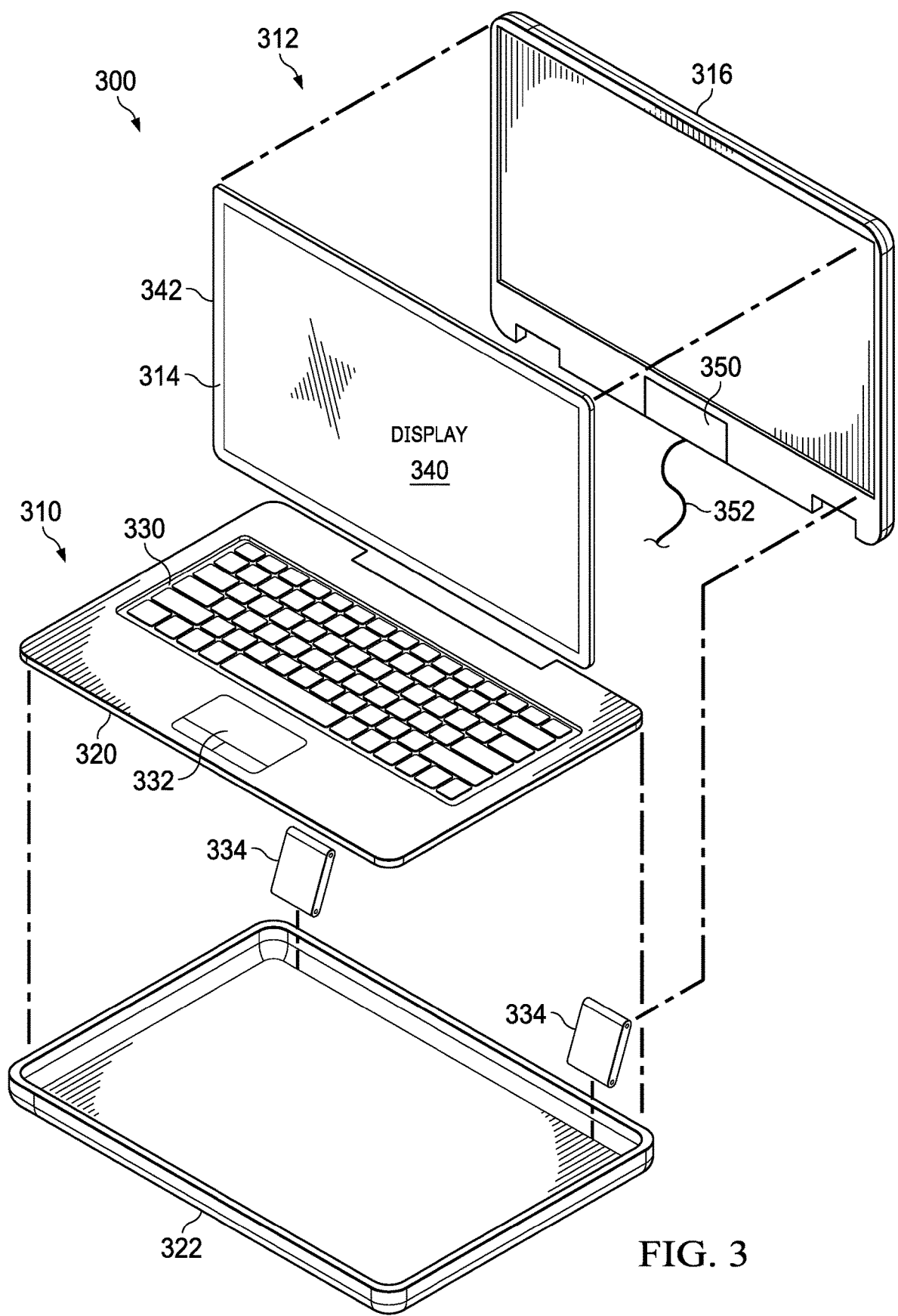
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown).

Lid housing portion 312 is rotationally coupled to main housing portion 310 via at least one hinge assembly 334. Lid housing portion 212 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e. g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 212 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 212 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
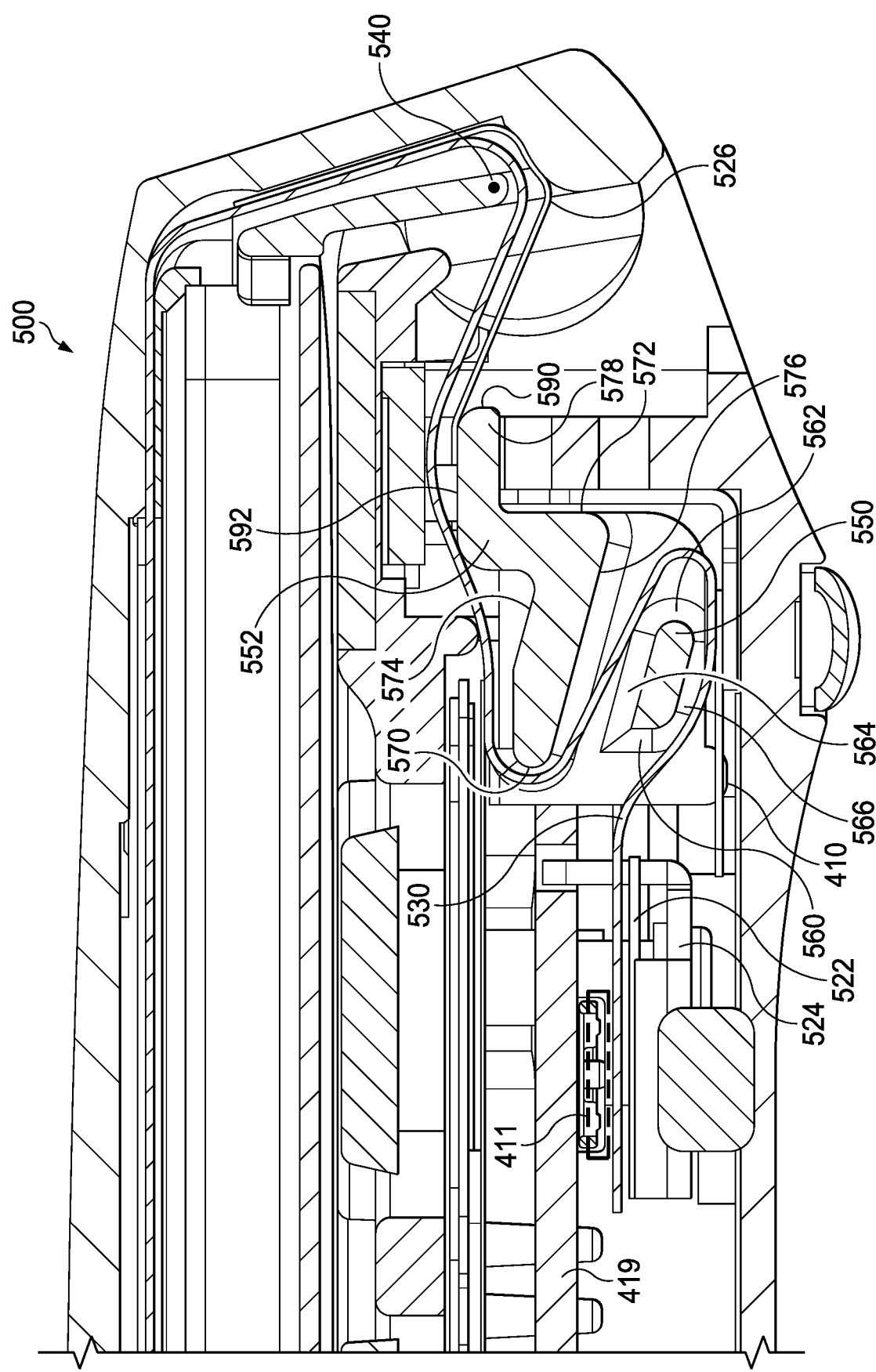
FIG. 4 shows a cross sectional view of a rear portion of a portable information handling system in a closed configuration.

FIG. 4 shows a cross sectional view of a rear portion of a portable information handling system 400 in a closed configuration. The rear portion of the portable information handing system 400 includes the cable routing bracket 410 and a cable connector 411 positioned within a portion of a base chassis. The rear portion of the portable information handling system 400 also includes a portion of an information handling system motherboard 419. In certain embodiments, the cable connector 411 is mounted to the motherboard 419. The cable connector 411 provides electrical and structural connection with to motherboard.

In certain embodiments, the base chassis is rotationally coupled with the display chassis via one or more hinges (e.g., hinges 420, 422). In certain embodiments, the rear portion of the portable information handling system includes a cable support component 422 and a cable attachment component 424. In certain embodiments the cable support component 422 includes a metal stiffener on the cable behind the FPC connector for surface mount technology (SMT) and handling protection. In certain embodiments, the cable attachment component 424 includes a retention bracket (which is attached to the motherboard vis screws) to prevent the connector pair from unmating. In certain embodiments, the rear portion of the portable information handling system includes a flexible cable protection component 426.

The rear portion of the portable information handling system 400 includes a cable 430. In certain embodiments, the cable 430 includes a flexible printed circuit (FPC) cable. In certain embodiments, the cable 430 includes a flexible portion and a non-flexible portion. The flexible portion corresponds to an area of the cable 430 that extends from where the cable exits the hinge up to the motherboard connector. In certain embodiments, the flexible portion is thinner than the non-flexible portion of the cable. In certain embodiments, the cable 430 includes one or both of a display control cable and a camera control cable. In certain embodiments, the cable 430 is connected between a component of the base chassis and a component of the display chassis. In certain embodiments, the cable 430 is connected between the motherboard 419 and a component of the display chassis. In certain embodiments, the component of the display chassis includes a display or a camera. In certain embodiments, the cable support component 422 and the cable attachment component 424 ensure the cable 430 is securely coupled to the motherboard via the cable connector 411.

In certain embodiments, the cable 430 is routed through the cable routing bracket 410. In certain embodiments, the cable routing bracket 410 causes the flexible printed circuit cable 430 to pivot about a hinge axis 440 of the hinge when the display chassis portion is rotated between an open configuration and a closed configuration. In certain embodiments, the cable routing bracket 410 includes a lower rib 450. In certain embodiments, the cable routing bracket 410 includes an upper rib 452. In certain embodiments, the flexible cable protection component 426 prevents external access to the cable 430 from a gap which is present is certain portions of the rear of portion of the portable information handling system between the base chassis and the display chassis. In certain embodiments, the flexible cable protection component 426 is physically connected from the cable routing bracket to the display chassis. In certain embodiments, the flexible cable protection component 426 pivots about the hinge axis 440 with the cable 430.

In certain embodiments, the lower rib 450 includes a forward facing edge 460, a rear facing edge 462, a top facing edge 464 and a bottom facing edge 466. The forward facing edge 460, the rear facing edge 462, the top facing edge 464 and the bottom facing edge 466 are designated as such with reference to a portable information handling system in which the base chassis is located on a flat horizontal surface. In certain embodiments, the upper rib 452 includes a forward facing edge 470, a rear facing edge 472, a top facing edge 474 and a bottom facing edge 476. In certain embodiments, the upper rib 452 includes a support protrusion 478 extending from the rear facing edge 472. The forward facing edge 470, the rear facing edge 472, the top facing edge 474 the bottom facing edge 476 and the support protrusion 476 are designated as such with reference to a portable information handling system in which the base chassis is located on a flat horizontal surface.

In certain embodiments, the rear facing edge 462 is curved to allow the cable 430 to wrap around the rear facing edge. In certain embodiments, the top facing edge 464 is slightly angled relative to horizontal. In certain embodiments, the top facing edge 464 is angled at 15 degrees (+/−20%) relative to horizontal. In certain embodiments, the bottom facing edge 466 is slightly angled relative to horizontal. In certain embodiments, the bottom facing edge 466 is angled at 15 degrees (+1-20%) relative to horizontal. In certain embodiments, angling the bottom facing edge 466 allows the cable routing bracket to guide the cable 430 to the connector 411. In certain embodiments, the horizontal dimension of the lower rib is smaller than the horizontal dimension of the upper rib to accommodate slack of the cable 430. In certain embodiments the horizontal dimension of the lower rib 450 is 40-60% smaller than the horizontal dimension of the upper rib 452 from its forward facing edge 470 to it rear facing edge 476.

In certain embodiments, the forward facing edge 470 is curved to allow the cable 430 to wrap around the forward facing edge. In certain embodiments, the top facing edge 474 includes a flat portion 480 and an angled portion 482. In certain embodiments, the angled portion 481 is slightly angled relative to horizontal. In certain embodiments, the flat portion 480 is flat relative (+/−20%) to horizontal and the angled portion 482 is angled at 15 degrees (+/−20%) relative to horizontal. In certain embodiments, the bottom facing edge 476 is slightly angled relative to horizontal. In certain embodiments, the bottom facing edge 466 is angled at 15 degrees (+/−20%) relative to horizontal. In certain embodiments, angling the bottom facing edge 466 allows the cable routing bracket to guide the cable 430 to the forward facing edge 470 from the rear facing edge 460 of the lower rib.

In certain embodiments, the support protrusion 478 includes a vertical portion 490 and a horizontal portion 492. In certain embodiments, the vertical portion 490 extends vertically from the angled portion 482 of the top facing edge 474. In certain embodiments, the horizontal portion extends perpendicularly from the vertical portion 490 of the support protrusion 478. In certain embodiments, the support protrusion 470 abuts an inside edge of the display chassis. In certain embodiments, abutting the support protrusion with the inside edge of the display chassis provides structural support for the cable routing bracket within the portable information handling system.

In certain embodiments, the lower rib 450 and upper rib 452 are vertically separated from each other by a predetermined distance 494. In certain embodiments, the predetermined distance is large enough to allow the cable 430 and any associated connection components (e.g., a connector, solder, etc.) to be fed between the low rib 450 and the upper rib 452 during assembly of the portable information handling system. In certain embodiments, the lower rib 450 and upper rib 452 are vertically separated from each other by 1.5 mm (+/−20%).

Figure 5:
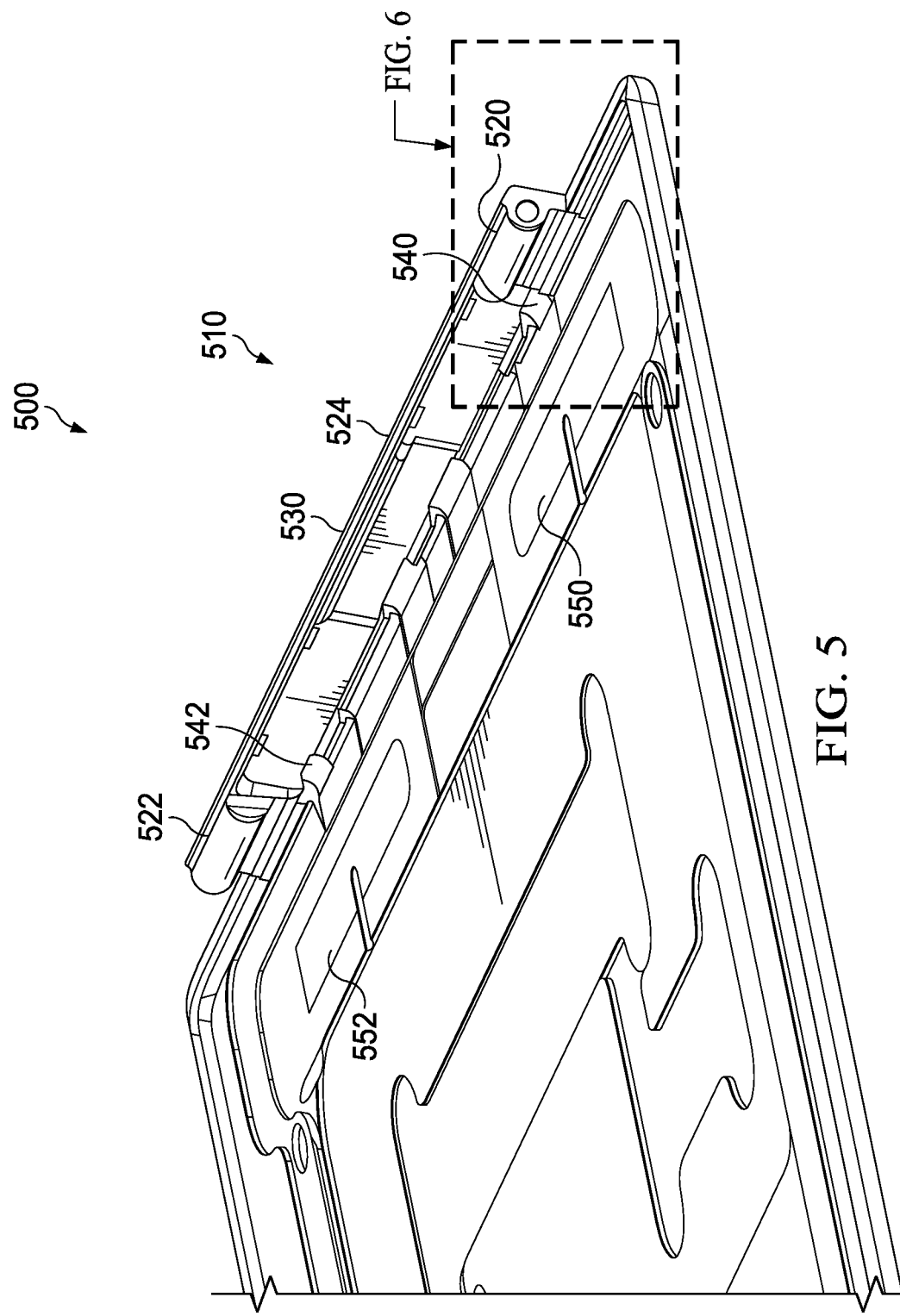
FIG. 5 shows a perspective view of a display chassis cover.

FIG. 5 shows a perspective view of a rear display cover portion 500 of a display chassis. In certain embodiments, the rear display cover portion 500 corresponds to rear display cover portion 316. In certain embodiments, the top cover portion 500 includes an A-Cover. In certain embodiments, the rear display cover portion 500 includes an attachment assembly 510. In certain embodiments, the attachment assembly 510 includes a hinge assembly 520, a hinge assembly 522 and a center wall assembly 526. In certain embodiments, the display chassis is rotationally-coupled to the base chassis via the attachment assembly 520. In certain embodiments, is rotationally-coupled to the base chassis via hinges attached to respective hinge assemblies 520, 522 of the attachment assembly 520. In certain embodiments, the hinges are press fit into respective hinge assemblies 520, 522 of the attachment assembly.

Various aspects of the disclosure include an appreciation that the hinge assemblies 520, 522 provide the structural support between the display chassis and the base chassis such that the center wall assembly 526 does not provide significant structural support. In certain embodiments, the center wall assembly 526 provides an aesthetic function of preventing view of components of the display chassis via the interconnection of the base chassis and the display chassis. In certain embodiments, the structural support provided by the hinge assemblies 520, 522 is sufficient to enable the portable information handling system to meet predetermined overbend requirements of the display chassis. In certain embodiments, the overbend requirements define an amount of pressure that must be applied to the display chassis before the chassis will rotate beyond a predetermined angle from the base chassis. In certain embodiments, the stop angle for the overbend is 135 degrees and the for to break is over 11 pounds at the top of the screen for systems that have a diagonal screen diameter less than 14 inches and 15 pounds for systems that have a diagonal screen diameter greater than 14 inches.

In certain embodiments, the center wall assembly 526 includes at least one locally thinned wall to provide the center wall assembly 526 with additional functionality. In certain embodiments, the center wall assembly 526 includes a cable routing portion 530. In certain embodiments, the cable routing portion 530 provides a cable routing function to the center wall assembly. In certain embodiments, the cable routing portion 530 routes one or more cables from the base chassis to the display chassis. In certain embodiments, the cable routing portion 530 routes one or both of a display control cable and a camera control cable. In certain embodiments, the cable being routed corresponds to cable 430.

In certain embodiments, the center wall assembly 526 includes one or both of a disassembly component storage portion 540 and a disassembly component storage portion 542. In certain embodiments, one or both of disassembly component storage portion 540, 542 store respective disassembly components. In certain embodiments, each disassembly component storage portion stores a respective disassembly component. In certain embodiments, a display cover portion is attached to a rear display cover portion via adhesive (e.g., adhesive portion 550, adhesive portion 552). In certain embodiments, the adhesive includes release functionality which enables performance of a disassembly operation. In certain embodiments, release functionality is activated by activating a disassembly component. In certain embodiments, the disassembly component is stored in a respective disassembly component storage portion 540, 542 until needed to perform the disassembly operation.

Figure 6:
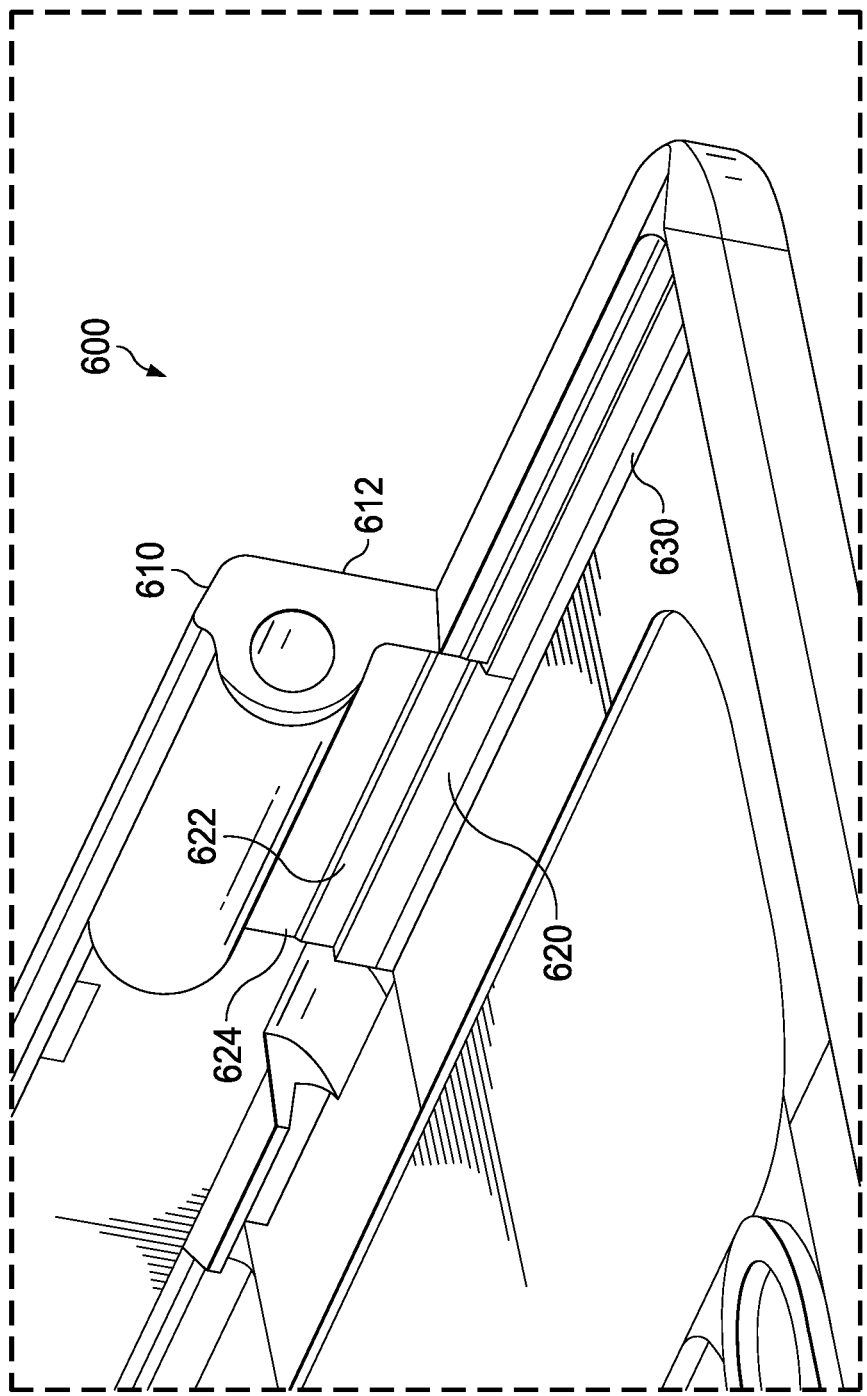
FIG. 6 shows a perspective view of a hinge portion of a display chassis cover.

FIG. 6 shows a perspective view of a hinge portion 600 of a display chassis cover. In certain embodiments, the hinge portion 600 corresponds to hinge assembly 420. It will be appreciated that in certain embodiments, a mirror image of hinge portion 600 would correspond to hinge assembly 622. In certain embodiments, the hinge portion 600 includes a hinge receptor cylinder 610 as well as a structural enhancement portion 612.

In certain embodiments, the hinge receptor cylinder 610 is configured to receive a portion of a hinge. In certain embodiments, the hinge is mechanically coupled to a base chassis. In certain embodiments, the hinge receptor cylinder 610 is configured to receive a press fit portion of a hinge.

In certain embodiments, the structural enhancement portion 612 is configured to provide structural support to the display chassis. In certain embodiments, the structural support provided by structural enhancement portion 612 is sufficient to enable the portable information handling system to meet predetermined overbend requirements of the display chassis. In certain embodiments, the structural enhancement portion 612 is configured such that it is thickest where the most stress from an overbend test is received. In certain embodiments, the structural enhancement portion 612 includes a plurality of tiered thickness portions 620, 622, 624 from an inside wall of the hinge assembly 600 to an outside wall of the hinge assembly 600. In certain embodiments, the tiered thickness portions 620, 622, 624 correspond to components contained within the display chassis such that a wider component corresponds to tiered thickness portion 624 and a narrower component corresponds to tiered thickness portion 622.

In certain embodiments, the thickest tiered thickness portion 620 is contiguous with an angled portion 630 of the inside wall of the rear display cover portion. In certain embodiments, the angled portion 630 of the inside wall of the rear display cover portion is locally thickened to provide additional structure support to the display chassis.

Figure 7:
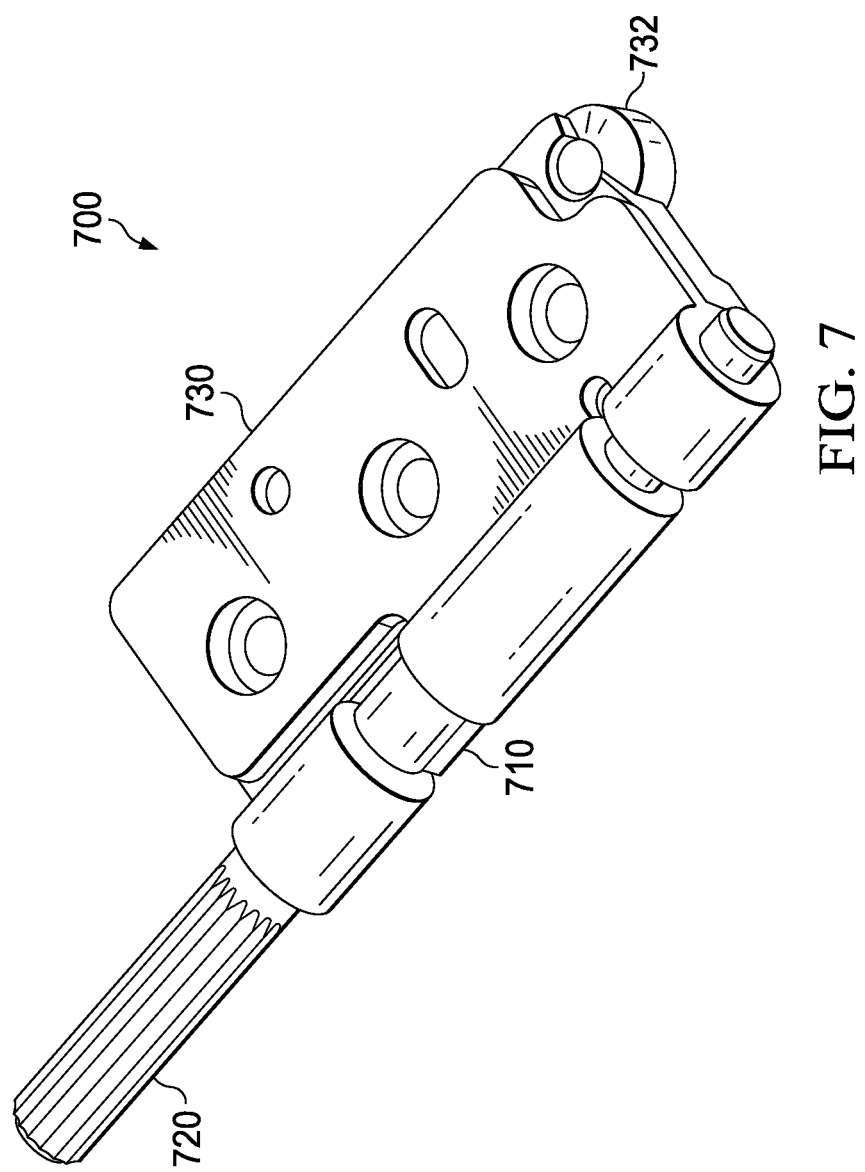
FIG. 7 shows a perspective view of a hinge of a portable information handling system.

FIG. 7 shows a perspective view of a hinge 700 of a portable information handling system. In certain embodiments, the hinge 700 includes a stopper feature 710. In certain embodiments, the hinge 700 includes a press fit portion 720. In certain embodiments, the stopper feature 710 is first to deform when performing an overbend test. In certain embodiments, the press fit portion 720 mates with a hinge receptor cylinder of a hinge assembly. In certain embodiments, the press fit portion 720 mates with a hinge receptor cylinder 610 of hinge assembly 600.

In certain embodiments, the hinge 700 includes a hinge plate 730 and a hinge plate 732. In certain embodiments, one of hinge plate 730 and hinge plate 732 is attached to a display chassis and another of hinge plate 730 and hinge plate 732 is attached to a base chassis.

Figure 8:
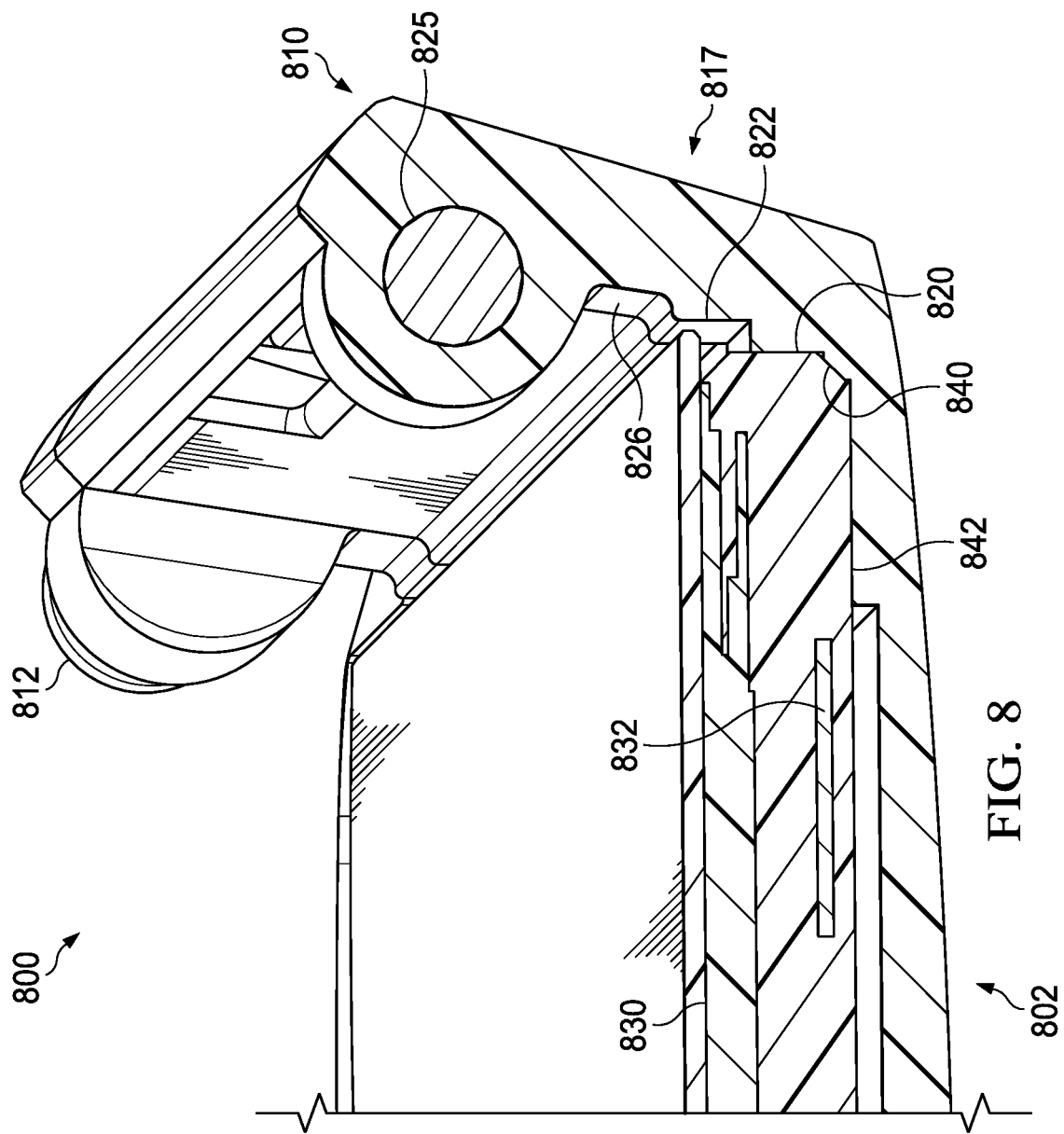
FIG. 8 shows a cross sectional perspective view of a hinge portion of a display chassis cover.

FIG. 8 shows a cross sectional perspective view of a rear portion 800 of a display chassis cover 802.

In certain embodiments, the hinge assembly 810 corresponds to hinge assembly 420. In certain embodiments, hinge portion 812 corresponds to hinge assembly 422. In certain embodiments, the hinge assembly 810 includes a hinge receptor cylinder 815 as well as a structural enhancement portion 817.

In certain embodiments, the hinge receptor cylinder 815 is configured to receive a portion of a hinge. In certain embodiments, the hinge is mechanically coupled to a base chassis. In certain embodiments, the hinge receptor cylinder 815 is configured to receive a press fit portion of a hinge.

In certain embodiments, the structural enhancement portion 817 is configured to provide structural support to the display chassis. In certain embodiments, the structural support provided by structural enhancement portion 817 is sufficient to enable the portable information handling system to meet predetermined overbend requirements of the display chassis. In certain embodiments, the structural enhancement portion 817 is configured such that it is thickest where the most stress from an overbend test is received. In certain embodiments, the structural enhancement portion 817 includes a plurality of tiered thickness portions 820, 822, 824 from an inside wall of the hinge assembly 817 to an outside wall of the hinge assembly 817. In certain embodiments, some or all of the tiered thickness portions 820, 822, 824 correspond to components contained within the display chassis such that a wider component corresponds to tiered thickness portion 824 and a narrower component corresponds to tiered thickness portion 822. In certain embodiments, a component 830 corresponds to tiered thickness portion 822. In certain embodiments, component 832 corresponds to tiered thickness portion 820.

In certain embodiments, the thickest tiered thickness portion 820 is contiguous with an angled portion 840 of the inside wall of the rear display cover portion. In certain embodiments, the angled portion 840 of the inside wall of the chassis cover 802 is locally thickened to provide additional structural support to the display chassis. In certain embodiments, the angled portion 840 is contiguous with a floor portion 842 of the chassis display cover 802. In certain embodiments, the floor portion 842 is locally thickened to provide additional structural support to the display chassis.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A portable information handing system, comprising:
a base chassis portion, the base chassis portion comprising a motherboard;
a display chassis portion, the display chassis portion comprising a rear display cover portion, the rear display cover portion comprising an attachment assembly, the attachment assembly comprising a hinge assembly, the rear display cover portion being rotationally-coupled to the base chassis portion via the hinge assembly, the hinge assembly providing structural support for the display chassis portion; and wherein
the hinge assembly includes a plurality of tiered portions, the plurality of tiered portions comprising a thickest tiered portion and a thinnest tiered portion, the thickest tiered portion being contiguous to an inside wall of the rear display cover portion.

2. The portable information handing system of claim 1, wherein:
the attachment assembly comprises a center wall assembly, the center wall assembly providing an aesthetic function of preventing view of components of the display chassis portion where the base chassis and the display chassis are rotationally-connected.

3. The portable information handing system of claim 2, wherein:
the attachment assembly comprises a locally thinned wall, the locally thinned wall providing the center wall assembly with additional functionality.

4. The portable information handing system of claim 3, wherein:
the additional functionality includes at least one of a cable routing function and a disassembly component storage function.

5. The portable information handing system of claim 1, wherein:
the rear display cover portion comprises an angled portion; and,
the thickest tiered portion is contiguous with the angled portion of the rear display cover portion.

6. An information handling system comprising:
a base chassis, the base chassis comprising a motherboard, the motherboard comprising a processor and a bus coupled to the processor;
a display chassis, the display chassis comprising a rear display cover, the rear display cover comprising an attachment assembly, the attachment assembly comprising a hinge assembly, the rear display cover being rotationally-coupled to the base chassis via the hinge assembly, the hinge assembly providing structural support for the display chassis; and wherein
the hinge assembly includes a plurality of tiered portions, the plurality of tiered portions comprising a thickest tiered portion and a thinnest tiered portion, the thickest tiered portion being contiguous to an inside wall of the rear display cover portion.

7. The information handling system of claim 6, wherein:
the attachment assembly comprises a center wall assembly, the center wall assembly providing an aesthetic function of preventing view of components of the display chassis portion where the base chassis and the display chassis are rotationally-connected.

8. The information handling system of claim 7, wherein:
the attachment assembly comprises a locally thinned wall, the locally thinned wall providing the center wall assembly with additional functionality.

9. The information handling system of claim 8, wherein:
the additional functionality includes at least one of a cable routing function and a disassembly component storage function.

10. The information handling system of claim 6, wherein:
the rear display cover portion comprises an angled portion; and,
the thickest tiered portion is contiguous with the angled portion of the rear display cover portion.

11. A display chassis, comprising:
a rear display cover, the rear display cover comprising an attachment assembly, the attachment assembly comprising a hinge assembly, the rear display cover being rotationally-coupled to the base chassis via the hinge assembly, the hinge assembly providing structural support for the display chassis; and wherein
the hinge assembly includes a plurality of tiered portions, the plurality of tiered portions comprising a thickest tiered portion and a thinnest tiered portion, the thickest tiered portion being contiguous to an inside wall of the rear display cover portion.

12. The display chassis of claim 11, wherein:
the attachment assembly comprises a center wall assembly, the center wall assembly providing an aesthetic function of preventing view of components of the display chassis portion where the base chassis and the display chassis are rotationally-connected.

13. The display chassis of claim 12, wherein:
the attachment assembly comprises a locally thinned wall, the locally thinned wall providing the center wall assembly with additional functionality.

14. The display chassis of claim 13, wherein:
the additional functionality includes at least one of a cable routing function and a disassembly component storage function.

15. The display chassis of claim 11, wherein:
the rear display cover portion comprises an angled portion; and,
the thickest tiered portion is contiguous with the angled portion of the rear display cover portion.

* * * * *